US008508795B2

United States Patent
Ohguro

(10) Patent No.: US 8,508,795 B2
(45) Date of Patent: Aug. 13, 2013

(54) INFORMATION PROCESSING APPARATUS, INFORMATION PROCESSING METHOD, AND COMPUTER PROGRAM PRODUCT FOR INSERTING INFORMATION INTO IN IMAGE DATA

(75) Inventor: Yoshihisa Ohguro, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 644 days.

(21) Appl. No.: 12/718,507

(22) Filed: Mar. 5, 2010

(65) Prior Publication Data

US 2010/0231938 A1 Sep. 16, 2010

(30) Foreign Application Priority Data

Mar. 16, 2009 (JP) .................. 2009-062715

(51) Int. Cl.
*G06K 1/00* (2006.01)
*G06F 17/28* (2006.01)
*G06K 9/00* (2006.01)
*G09G 5/02* (2006.01)

(52) U.S. Cl.
USPC .......... 358/1.9; 358/1.15; 358/3.28; 382/100; 704/2; 345/625

(58) Field of Classification Search
None
See application file for complete search history.

(56) References Cited

U.S. PATENT DOCUMENTS

| | | | |
|---|---|---|---|
| 5,646,840 A * | 7/1997 | Yamauchi et al. ................ 704/2 |
| 5,652,896 A | 7/1997 | Yamauchi et al. | |
| 5,675,815 A | 10/1997 | Yamauchi et al. | |
| 5,701,497 A | 12/1997 | Yamauchi et al. | |
| 5,845,143 A | 12/1998 | Yamauchi et al. | |
| 6,226,614 B1 * | 5/2001 | Mizuno et al. ................ 704/260 |
| 6,334,106 B1 * | 12/2001 | Mizuno et al. ................ 704/260 |
| 7,623,716 B2 * | 11/2009 | Itonori et al. ................ 382/229 |
| 7,634,738 B2 * | 12/2009 | Clow et al. .................... 715/802 |
| 7,697,757 B2 * | 4/2010 | Yacoub et al. ................ 382/176 |
| 7,783,472 B2 * | 8/2010 | Nagao et al. ...................... 704/2 |
| 2006/0217960 A1 * | 9/2006 | Kato et al. ......................... 704/2 |
| 2007/0046694 A1 * | 3/2007 | Aizikowitz et al. ........... 345/619 |
| 2009/0049026 A1 | 2/2009 | Ohguro | |
| 2009/0296124 A1 | 12/2009 | Ohguro | |

FOREIGN PATENT DOCUMENTS

| | | | |
|---|---|---|---|
| JP | 62-179053 | * | 8/1987 |
| JP | 5-266074 | | 10/1993 |
| JP | 05-266075 | * | 10/1993 |
| JP | 5-314175 | | 11/1993 |
| JP | 5-324704 | | 12/1993 |
| JP | 5-324709 | | 12/1993 |
| JP | 5-324720 | | 12/1993 |
| JP | 7-65012 | | 3/1995 |
| JP | 9-223147 | | 8/1997 |

(Continued)

OTHER PUBLICATIONS

Office Action mailed Mar. 22, 2013, in Japanese Patent Application No. 2009-062715, filed Mar. 16, 2009, 2 pages.

*Primary Examiner* — Steven Kau
(74) *Attorney, Agent, or Firm* — Oblon, Spivak, McClelland, Maier & Neustadt, L.L.P.

(57) ABSTRACT

An image processing apparatus obtains image data containing a plurality of pieces of character information, obtains corresponding information that corresponds to the character information contained in the obtained image data, obtains, using the character information, area information indicating an area to which the corresponding information is to be inserted, and determines an insertion style of the corresponding information based on the obtained area information.

9 Claims, 14 Drawing Sheets

(56) References Cited

FOREIGN PATENT DOCUMENTS

| | | |
|---|---:|---:|
| JP | 9-311859 | 12/1997 |
| JP | 11-120185 | 4/1999 |
| JP | 3105982 | 9/2000 |
| JP | 3161942 | 2/2001 |
| JP | 2001-326804 * | 11/2001 |
| JP | 3265014 | 12/2001 |
| JP | 3269842 | 1/2002 |
| JP | 2003-16065 | 1/2003 |
| JP | 3424942 | 5/2003 |
| JP | 2005-092414 | 4/2005 |
| JP | 2009-294788 | 12/2009 |

* cited by examiner

| LINE-BY-LINE CHARACTER INFORMATION | COORDINATE INFORMATION | |
|---|---|---|
| 文字認識技術は… | $X_1, Y_1 - X_2, Y_2$ | |
| です。オフィス業務の… | $X_3, Y_3 - X_4, Y_4$ | |
| でも紙が使用される… | $X_5, Y_5 - X_6, Y_6$ | ⋯ |
| する期待は小さくなる… | $X_7, Y_7 - X_8, Y_8$ | |
| ⋮ | | |

FIG. 10 original documents establishing your age, identity and U.S. citizenship or lawful alien status, such as a birth certificate and a driver's license;

FIG. 11 original documents establishing your age,
独創的な　　　　　　確立する
identity and U.S. citizenship or lawful alien 外国の
同一であること　　市民権　　　　合法的な
status, such as a birth certificate and a
状態　　　　　　　　出生証明書
driver's license;
運転手　免許

FIG. 12 original documents establishing your age,
      43               73        30
identity and U.S. citizenship or lawful alien
   31              74         75          76
status, such as a birth certificate and a
  77               78
driver's license;
    79         80

FIG. 13

42 [particularly] [副] 特に；詳しく
43 [original] [形] 独創的な；原型の；最初の [限定用法] 新奇な [名] 原物；原型；[the-] 原文；[the-] 原典
44 [role] [名] 役割；役(目)；任務
45 [provide] [動] 供給する；規定する；備える；提供する；準備をする；まかなう，用意する
46 [come from] [動] 〜の出身である；〜から来る；〜に由来する
47 [third party] [名] 第三者 〈法〉；第三党 〈政〉；少数党 〈改〉
48 [medical] [形] 医学 〈医療〉；内科の [名] 開業医；医学生；健康診断
49 [facilities] [名] 設備，便宜；facilityの複数形 [容易さ；熟練；才能
50 [describe] [動] 述べる；記述 [描写] する；評する
51 [extent] [名] 広さと大きさ；範囲；程度
52 [court] [名] 法廷；宮廷；裁判所；[the-] 裁判官 〈法〉；(テニスなどの)コート [動] 求める；(危険を) 招く；言い寄る
53 [restrain] [動] 静止 [抑制] する；我慢する
54 [shelter] [名] 避難所；待合所；防空壕；避難，保護；住まい，宿 [動] 保護する；庇護する；避難する；避ける
55 [counselor] [名] 顧問；弁護士；相談相手；カウンセラー
56 [knowledge] [名] 知識，情報，学問；認識，知(っていること
57 [confidential] [形] 秘密の，頼みにいる；信任した
58 [furnish] [動] (必要な物を)供給する；(家具を)備え付ける
59 [therefore] [副] それゆえに；その結果
60 [be careful about] [動] 〜を心配する，〜に気をつける；〜にやかましい
61 [share] [名] ①分け前 [動] ①分け当て；分担，株(券)，出資；分担；②鋤の刃先 [動] ①共有する；分配する；分け合う；分担する

FIG. 14
| WORD-BY-WORD CHARACTER INFORMATION | COORDINATE INFORMATION | |
|---|---|---|
| original | $X_1, Y_1 - X_2, Y_2$ | |
| document | $X_3, Y_3 - X_4, Y_4$ | ... |
| establishing | $X_5, Y_5 - X_6, Y_6$ | |
| your | $X_7, Y_7 - X_8, Y_8$ | |
| | ⋮ | |
FIG. 15
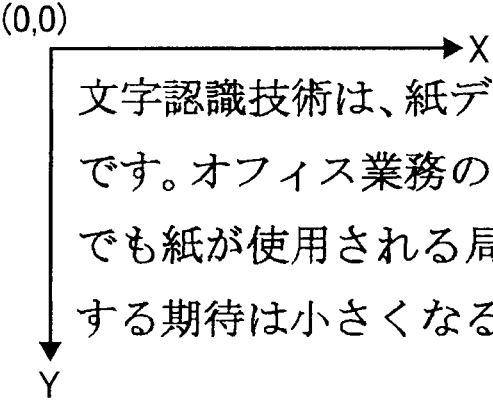
FIG. 16
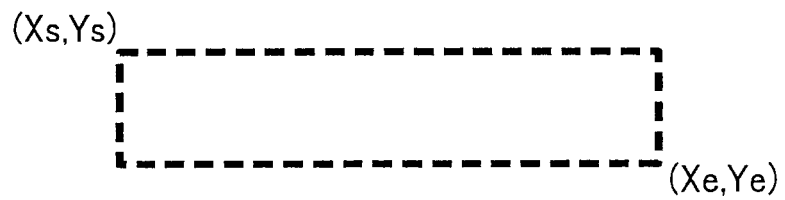

NOT OVERLAPPED WITH NEXT LINE

OVERLAPPED WITH NEXT LINE

FIG. 22
ASCENDER LINE
MEAN LINE
BASELINE
DESCENDER LINE
ASCENDER LINE
MEAN LINE
BASELINE
DESCENDER LINE
FIG. 23
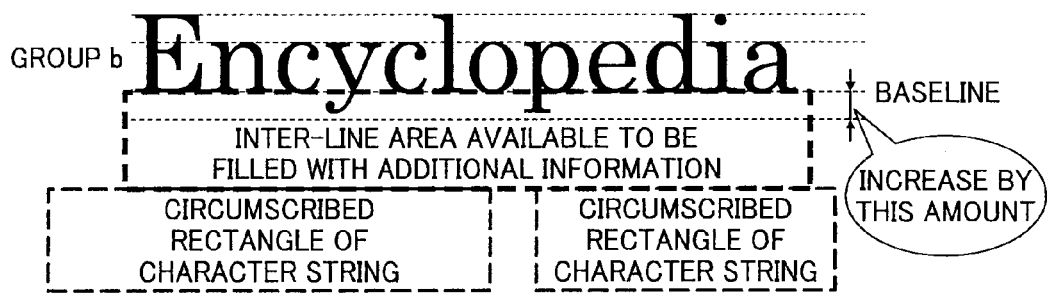
FIG. 24
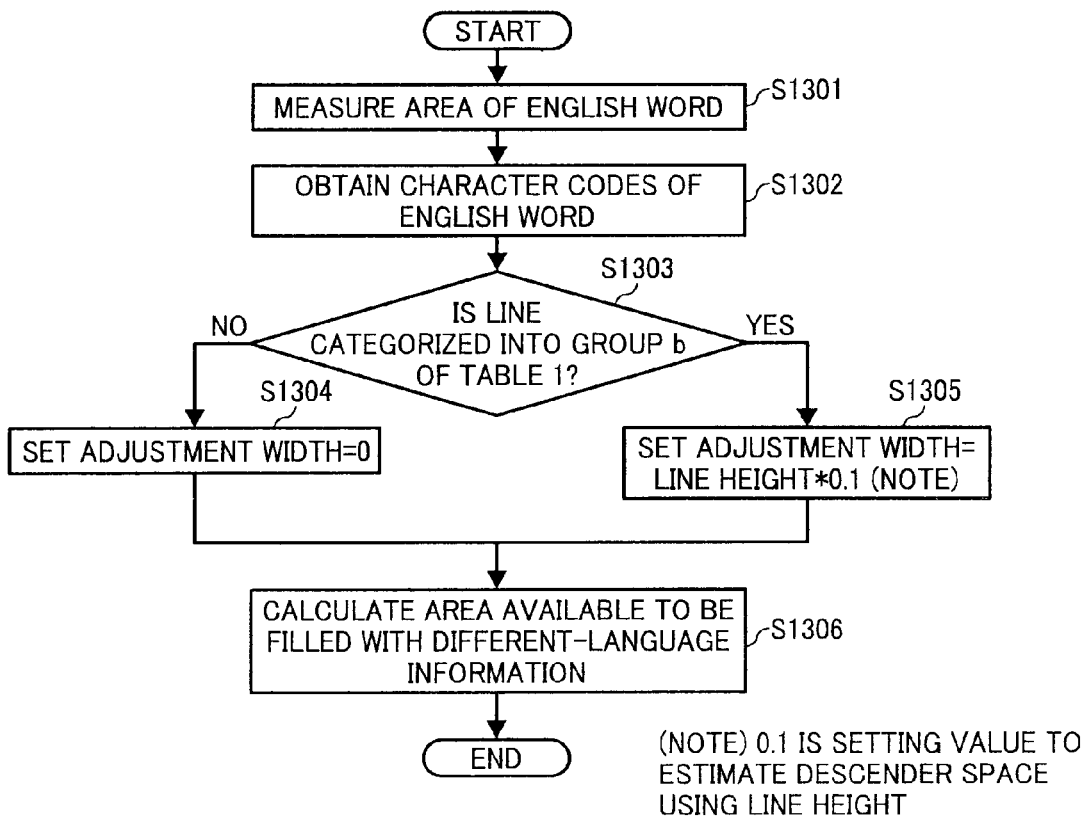
(NOTE) 0.1 IS SETTING VALUE TO ESTIMATE DESCENDER SPACE USING LINE HEIGHT

REMAINING AREA UNCHANGED AS IT IS CALCULATED USING LINE RECTANGLE

MOVE UPPER SIDE UP AND LOWER SIDE DOWN FROM POSITIONS THAT ARE CALCULATED USING LINE RECTANGLE

MOVE LOWER SIDE DOWN FROM POSITION THAT IS CALCULATED USING LINE RECTANGLE

REMAINING AREA UNCHANGED AS IT IS CALCULATED
USING LINE RECTANGLE

MOVE UPPER SIDE UP FROM POSITION
THAT IS CALCULATED USING LINE RECTANGLE

Time flies like an arrow, fruit flies like a banana. The road to hell is paved with good intentions.

AREA AVAILABLE TO BE FILLED WITH
CORRESPONDING INFORMATION SENTENCE-BY-SENTENCE

Time flies like an arrow, fruit
時バエは矢を好む、ショウジョウバエはバナナを好む。
flies like a banana. The road to
地獄への道は善意で
hell is paved with good
舗装されている。
intentions.

EXAMPLE ADDED WITH CORRESPONDING INFORMATION
SENTENCE- BY-SENTENCE (MACHINE TRANSLATION)

INFORMATION PROCESSING APPARATUS, INFORMATION PROCESSING METHOD, AND COMPUTER PROGRAM PRODUCT FOR INSERTING INFORMATION INTO IN IMAGE DATA

CROSS-REFERENCE TO RELATED APPLICATIONS

The present application claims priority to and incorporates by reference the entire contents of Japanese Patent Application No. 2009-062715 filed in Japan on Mar. 16, 2009.

BACKGROUND OF THE INVENTION

1. Field of the Invention

The present invention relates to an information processing apparatus, an information processing method, and a computer program product.

2. Description of the Related Art

With the current trend of the spread of electrically available information, image forming apparatuses and image processing apparatuses, such as printers and facsimile machines, that are used to output information have become important. Most image processing apparatuses are designed to have various functions, such as an image capturing function, an image forming function, and a communication function. That is to say that image processing apparatuses are designed as multifunction products (MFPs) that work as a printer, a facsimile machine, a scanner, a copier, etc.

Methods of outputting image data that have additional words added in a different language as a translation (hereinafter, "different-language words") have been proposed. Such methods include using an MFP to copy an original document (see, for example, Japanese Patent No. 3105982 and Japanese Patent No. 3269842).

Japanese Patent No. 3105982 and Japanese Patent No. 3269842 disclose methods of forming, in the form of printed matter, an image that includes a translation. In these methods, an original image and information about different-language words are combined together as a single image. Therefore, the outline of the original document to be copied can be deformed or a part of the information contained in the original document can be deleted. If, for example, spaces between the lines of the image data of the original document increase, the maximum number of lines per page decreases. Accordingly, the outlines of pages that constitute the document are deformed and the total number of the pages is increased. Moreover, if tables, diagrams, etc. included in the original document are deleted, it is difficult or impossible to understand the contents of the document. In other words, in the technologies disclosed in Japanese Patent No. 3105982 and Japanese Patent No. 3269842, the original image and the information about the different-language words are not separable and fidelity to the original document is not taken into consideration. Moreover, although the image is effective if it is printed out, usage of the image in an electronic form is not taken into consideration.

SUMMARY OF THE INVENTION

It is an object of the present invention to at least partially solve the problems in the conventional technology.

According to a first aspect of the present invention, there is provided an information processing apparatus that inserts corresponding information, which corresponds to character information contained in image data, to the image data. The information processing apparatus includes an image-data obtaining unit that obtains image data containing a plurality of pieces of character information; a corresponding-information obtaining unit that obtains corresponding information that corresponds to the character information obtained from the image data; an area-information obtaining unit that obtains area information that indicates an area to which the corresponding information is to be inserted, depending on a formation of lines containing the character information; and an insertion-style determining unit that determines an insertion style of the corresponding information based on the obtained area information.

According to another aspect of the present invention, there is provided an information processing method of inserting corresponding information, which corresponds to character information contained in image data, to the image data. The information processing method includes obtaining image data that contains a plurality of pieces of character information; obtaining corresponding information that corresponds to the character information that is obtained from the image data; obtaining area information that indicates an area to which the corresponding information is to be inserted, depending on a formation of lines containing the character information; and determining an insertion style of the corresponding information based on the obtained area information.

According to still another aspect of the present invention, there is provided a computer program product that causes a computer to perform the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram of an example of input information according to the embodiment of the present invention;

FIG. 6 is a schematic diagram of an example of input information according to the embodiment of the present invention;

FIG. 7 is a schematic diagram of an example of input information according to the embodiment of the present invention;

FIG. 10 is a schematic diagram of another example of input information (character image) according to the embodiment of the present invention;

FIG. 11 is a schematic diagram of an exemplary image that includes character information and corresponding information according to the embodiment of the present invention;

FIG. 12 is a schematic diagram of another exemplary image that includes the character information and (a part of) the corresponding information according to the embodiment of the present invention;

FIG. 13 is a schematic diagram of an exemplary image of (a part of) the corresponding information according to the embodiment of the present invention;

FIG. 14 is a schematic diagram of another example of the character/display-area information according to the embodiment of the present invention;

FIG. 15 is a schematic diagram that explains a coordinate system of image data according to the embodiment of the present invention;

FIG. 16 is a schematic diagram of area-defining coordinates of the image data according to the embodiment of the present invention;

FIG. 22 is a schematic diagram of imaginary lines of the Latin alphabets according to the embodiment of the present invention;

FIG. 23 is a schematic diagram of an example of an area available to be filled with the corresponding information that is calculated based on Table 1 according to the embodiment of the present invention;

FIG. 24 is another detailed flowchart of the insertion-style determining process (at Step S1107) of FIG. 9, different from the detailed flowchart of FIG. 20;

DETAILED DESCRIPTION OF THE PREFERRED EMBODIMENTS

Exemplary embodiments of the present invention are described in detail below with reference to the accompanying drawings.

In the following embodiments, an image processing apparatus that is an MFP having scanner, printer, and copy functions is used as an information processing apparatus that inserts information about, for example, different-language words to received information. In a process of forming an image, for example, printing or copying, the image processing apparatus analyzes information that is input thereto as a target of the image forming process and inserts additional information, for example, different-language words and comments to the input information. The main feature of the image processing apparatus according to the present embodiment is in the analysis of the received information and the insertion of the additional information, for example, different-language words.

Figure 1:
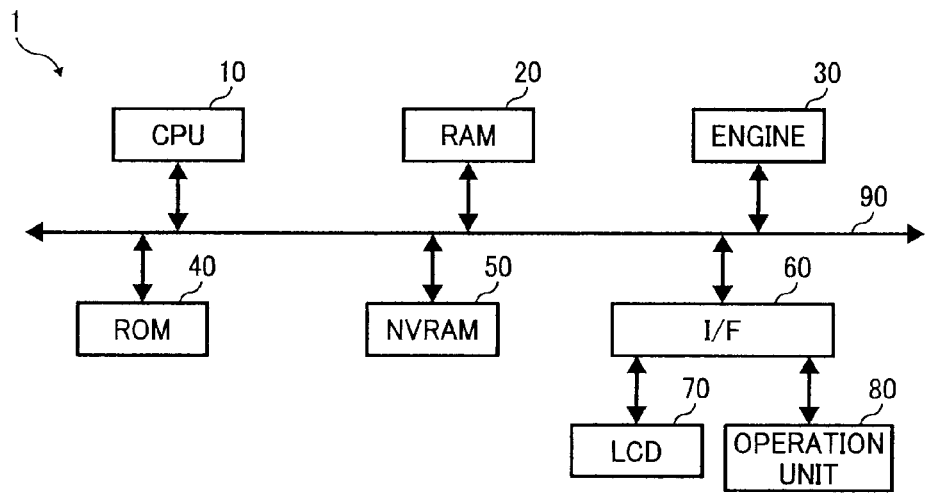
FIG. 1 is a block diagram of the hardware configuration of an image processing apparatus according to an embodiment of the present invention.

FIG. 1 is a block diagram of the hardware configuration of an image processing apparatus 1 according to the present embodiment.

As shown in FIG. 1, the image processing apparatus 1 according to the present embodiment has the configuration the same as that of an information processing terminal, such as a typical server and a personal computer (PC). The image processing apparatus 1 includes a central processing unit (CPU) 10, a random access memory (RAM) 20, an engine 30, a read only memory (ROM) 40, a non-volatile random access memory (NVRAM) 50 and an interface (I/F) 60 connected to each other via a bus 90. The I/F 60 is connected to a liquid crystal display (LCD) 70 and an operation unit 80.

The CPU 10 is a computing unit and controls the image processing apparatus 1. The RAM 20 is a volatile readable/writable recording medium with a high processing speed. The CPU 10 uses the RAM 20 as a work area when it performs information processing. The engine 30 is an image processing engine that performs image processing functions, such as the scanner function and the printer function. The ROM 40 is a nonvolatile read only memory. The ROM 40 stores therein computer programs in the form of, for example, firmware.

The NVRAM 50 is a nonvolatile readable/writable recording medium and stores therein an operating system (OS), various control programs, application programs, information about parameters used in the application programs, etc. The I/F 60 connects the bus 90 to, for example, various hardware components and various networks and controls communications therebetween. The LCD 70 is a visual user interface with which a user confirms a state of the image processing apparatus 1. The operation unit 80 is a user interface, such as a keyboard and a mouse, with which the user inputs information to the image processing apparatus 1.

With the above-described hardware configuration, a computer program is read from, for example, the ROM 40, the NVRAM 50, another recording medium, such as a hard disk drive (HDD) (not shown) or an optical disk, and is loaded into the RAM 20. When the CPU 10 operates according to the read computer program, a software control unit is implemented. With cooperation of the implemented software control unit and the hardware components, functional blocks that implement the functions of the image processing apparatus 1 according to the present embodiment are made up.

Figure 2:
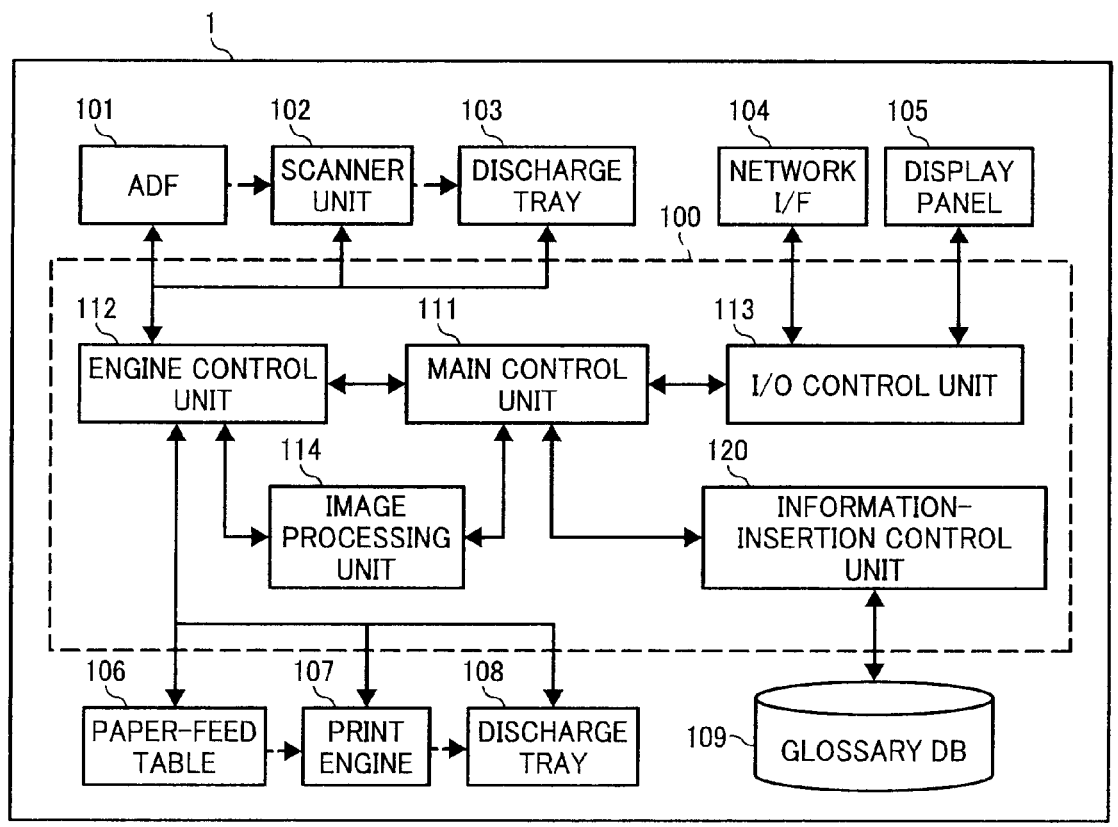
FIG. 2 is a block diagram of the functional configuration of the image processing apparatus according to the embodiment of the present invention.

FIG. 2 is a block diagram of the functional configuration of the image processing apparatus 1 according to the present embodiment. As shown in FIG. 2, the image processing apparatus 1 includes a controller 100, an auto document feeder (ADF) 101, a scanner unit 102, a discharge tray 103, a network I/F 104, a display panel 105, a paper-feed table 106, a print engine 107, a discharge tray 108, and a glossary database (DB) 109.

The controller 100 includes a main control unit 111, an engine control unit 112, an input/output (I/O) control unit 113, an image processing unit 114, and an information-insertion control unit 120. The full lines shown in FIG. 2 indicate electrical connections between the units and the dot lines indicate a flow of a sheet. The controller 100 is implemented when the CPU 10 operates according to the computer program loaded on the RAM 20 shown in FIG. 1.

The network I/F 104 is an interface that is used to communicate the image processing apparatus 1 with an eternal device, such as a client terminal. The network I/F 104 is implemented by the I/F 60 shown in FIG. 1. When a client terminal sends a print job to the controller 100, the controller 100 receives the print job via the network I/F 104 and performs the image forming process using the print job.

The display panel 105 is an output interface that visually displays the state of the image processing apparatus 1 and an input interface with which the user controls the image processing apparatus 1. The display panel 105 is implemented by the LCD 70 and the operation unit 80 shown in FIG. 1.

The glossary DB 109 contains glossary information that includes words and descriptions in the associated manner and information that includes technical terms and descriptions in the associated manner. The glossary DB 109 is implemented by information stored in the NVRAM 50 shown in FIG. 1 or a nonvolatile recording medium, such as an HDD (not shown).

The main control unit 111 controls the units included in the controller 100 and gives these units various instructions. The engine control unit 112 works as a driving unit that controls or drives the print engine 107, the scanner unit 102, and etc. The I/O control unit 113 inputs information, for example, a print job received via the network I/F 104 to the main control unit 111. The I/O control unit 113 sends, according to the instruction received from the main control unit 111, information to an external device that is connected to a network via the network I/F 104.

The image processing unit 114 creates, under the control of the main control unit 111, drawing information using information contained in the print job. The drawing information is information that is used when the print engine 107 draws an image in the image forming process. The image processing unit 114 processes picked-up image data that is received from the scanner unit 102 and creates image data. The image data is information to be stored in an HDD (not shown) as a product of the scanner operation or sent to a client terminal via the network I/F 104.

Under the control of the main control unit 111, the information-insertion control unit 120 analyzes information that is input as a target of the image forming/outputting process and inserts additional information to the received information. The information-insertion control unit 120 performs the above-described analysis and insertion process by referring to the glossary DB 109. The function that is provided by the information-insertion control unit 120 is the main feature of the present embodiment.

If the image processing apparatus 1 is in the printer mode, when the I/O control unit 113 receives a print job via a universal serial bus (USB) or a local area network (LAN) that is connected to the network I/F 104, a print job occurs. When the print job occurs, the main control unit 111 inputs image information contained in the print job to the information-insertion control unit 120. Under the control of the main control unit 111, the information-insertion control unit 120 inserts additional information, for example, different-language words and comments to the input information and creates output information.

When the information insertion is completed, the information-insertion control unit 120 sends the created output information to the main control unit 111. The image processing unit 114 creates, according to the instruction received from the main control unit 111, drawing information using the output information that is created by the information-insertion control unit 120. The drawing information created by the image processing unit 114 is sequentially stored in an HDD (not shown) that works as a temporary memory.

The engine control unit 112 drives the paper-feed table 106 under the control of the main control unit 111 so that a printing sheet is conveyed to the print engine 107. The engine control unit 112 obtains the drawing information from the not-shown HDD and inputs the drawing information to the print engine 107. The print engine 107 forms an image on the printing sheet coming from the paper-feed table 106 using the drawing information that is received from the engine control unit 112. In other words, the print engine 107 works as an image forming unit. The print engine 107 is, for example, an inkjet image forming apparatus or an electrographic image forming apparatus.

As described above, the main feature of the image processing apparatus 1 according to the present embodiment is in the process of inserting the different-language words and the comments performed by the information-insertion control unit 120. The information-insertion control unit 120 according to the present embodiment is described in detail below with reference to FIG. 3.

Figure 3:
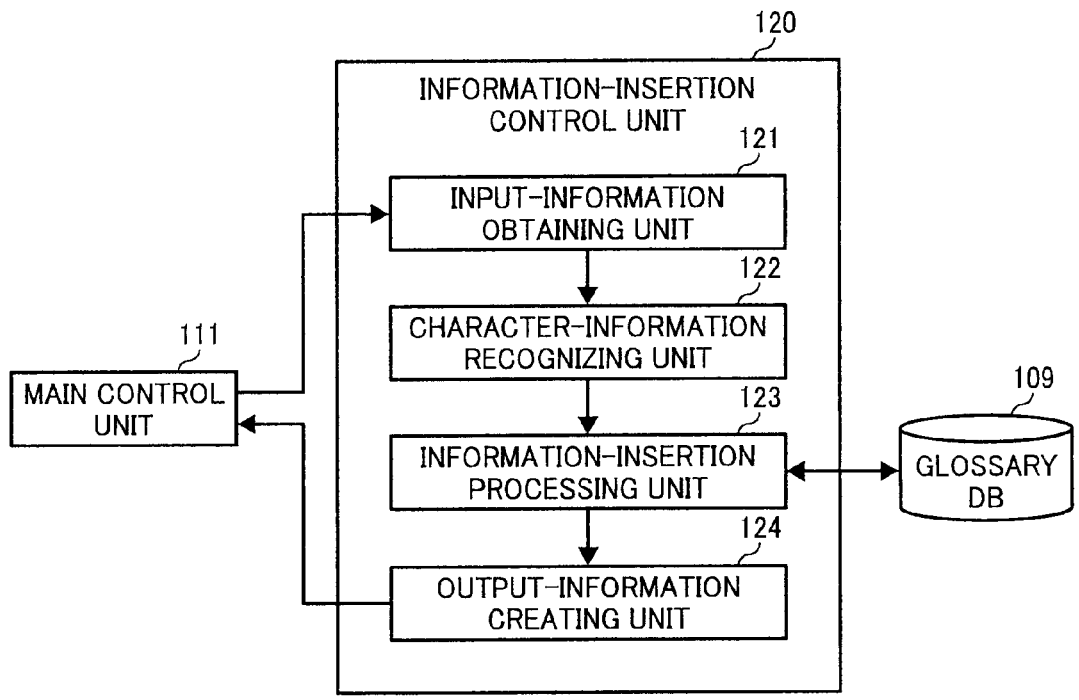
FIG. 3 is a block diagram of the functional configuration of an information-insertion control unit.

FIG. 3 is a block diagram that illustrates the configuration of the information-insertion control unit 120 and the relation among the information-insertion control unit 120, the main control unit 111, and the glossary DB 109. As shown in FIG. 3, the information-insertion control unit 120 includes an input-information obtaining unit 121, a character-information recognizing unit 122, an information-insertion processing unit 123, and an output-information creating unit 124. The information-insertion control unit 120 is implemented when the CPU 10 operates according to the computer program loaded on the RAM 20 shown in FIG. 1.

The input-information obtaining unit 121 obtains information that is input as a target of the image forming/outputting process, i.e., information to which different-language words and comments are added (hereinafter, "input information"). The input information is input to the image processing apparatus 1 as image information that is created by the scanning process performed by the scanner unit 102 or image information contained in the print job that is received via the network I/F 104. The input-information obtaining unit 121 obtains the input information from the main control unit 111. The input-information obtaining unit 121 inputs the obtained input information to the character-information recognizing unit 122.

The character-information recognizing unit 122 recognizes character information contained in the input information that is obtained by the input-information obtaining unit 121. The character-information recognizing process performed by the character-information recognizing unit 122 is not limited to optical character recognition (OCR). It can be a process of recognizing character codes contained in the received image information via, for example, the print job.

Figure 4:
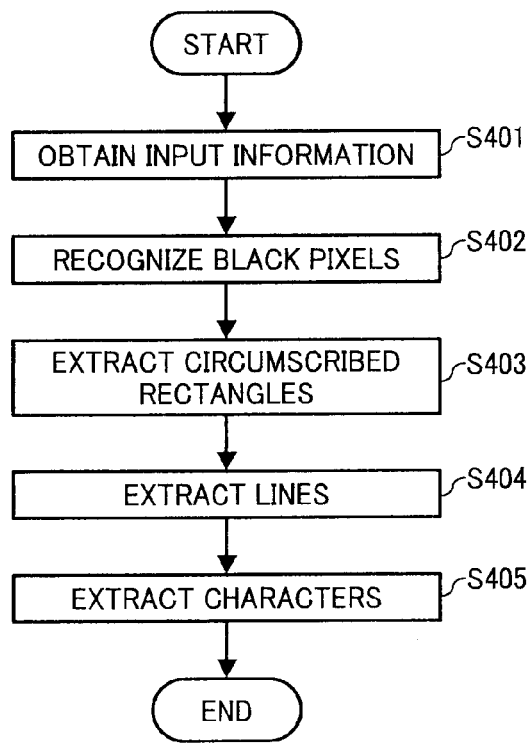
FIG. 4 is a flowchart of operations of a character-information recognizing unit.

FIG. 4 is a flowchart of the character recognizing process performed by the character-information recognizing unit 122. As shown in FIG. 4, in the character recognizing process according to the present embodiment, the character-information recognizing unit 122 obtains the input information from the input-information obtaining unit 121 (Step S401). It is assumed that the image shown in FIG. 5 is obtained as the input information in the flowchart of FIG. 4. The input information shown in FIG. 5 is image information illustrating sentences with letters written in black on a white background.

When the character-information recognizing unit 122 obtains the input information shown in FIG. 5, the character-information recognizing unit 122 recognizes sequential black pixels in the input information (Step S402). After that, the character-information recognizing unit 122 extracts circumscribed rectangles of the recognized black pixels (Step S403). FIG. 6 is a schematic diagram that explains a result of the rectangle extracting process performed by the character-information recognizing unit 122. When the circumscribed rectangles shown in FIG. 6 are extracted, the character-information recognizing unit 122 extracts lines by combining adjacent rectangles together in such a manner that the combined rectangle extends in a fixed direction (Step S404). FIG. 7 is a schematic diagram that explains a result of the line extracting process performed by the character-information recognizing unit 122.

In the line extracting process at Step S404, the direction in which the rectangles are combined together changes according to whether the document is written vertically or horizontally. If the document contained in the input information is written vertically, the character-information recognizing unit 122 combines the rectangles together in the vertical direction. On the other hand, if the document contained in the input information is written horizontally, the character-information recognizing unit 122 combines the rectangles together in the horizontal direction. As shown in FIG. 7, the document indicated by the input information in the present embodiment is written horizontally. Therefore, the character-information recognizing unit 122 extracts lines by combining the rectangles together in the horizontal direction. In the example shown in FIG. 4, long rectangles indicating lines shown in FIG. 7 (hereinafter, "line images") are extracted as a result of the process at Step S404. Other than extracting the line images, the character-information recognizing unit 122 also can extract, for example, English word display areas each indicating an area of a single English word.

When the line images shown in FIG. 7 are extracted, the character-information recognizing unit 122 extracts characters from each of the extracted line images (Step S405). In the character extracting process, the character-information recognizing unit 122 extracts text data corresponding to character images using feature extraction and pattern dictionary comparison and thus performs the character recognition. The well-known technologies can be used in the character recognizing process and therefore the character recognizing process is not described in detail.

Figures 8, 9:
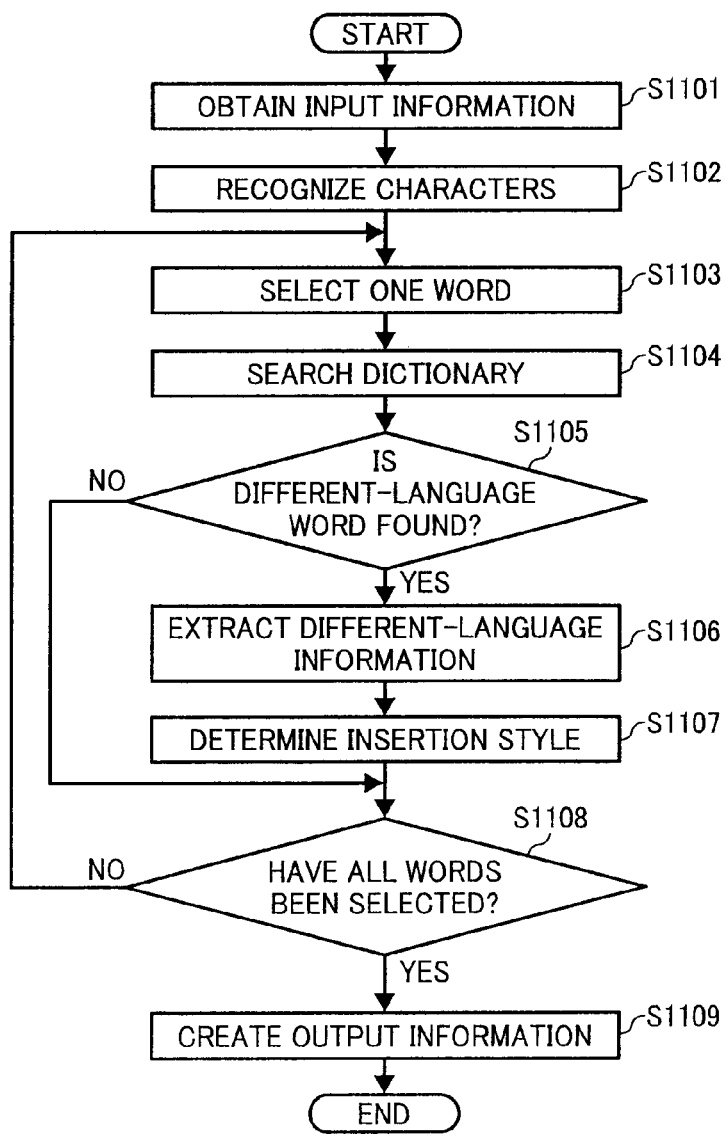
FIG. 8 is a schematic diagram of an example of character/display-area information according to the embodiment of the present invention.
FIG. 9 is a flowchart of operations of the information-insertion control unit according to the embodiment of the present invention.

When the character information is extracted by the character recognizing process of FIG. 4, the character-information recognizing unit 122 creates information that contains the extracted character information and information indicating the area in which the character information is displayed on the image of the input information in association with each other (hereinafter, "character/display-area information"). FIG. 8 is a schematic diagram that explains contents of the character/display-area information created in the example of FIG. 4. As shown in FIG. 8, the character/display-area information according to the present embodiment contains the character information indicating characters of each line that is extracted at Step S404 (hereinafter, "line-by-line character information") and information about coordinates indicating the area in which the lien character information is displayed. If the English word display areas are extracted at Step S404, the information created at Step S405 includes word-by-word character information instead of the line-by-line character information.

The information-insertion processing unit 123 inserts additional information, for example, different-language words and comments to the character information based on the character information obtained by the character-information recognizing unit 122 and the glossary DB 109. The additional information is information corresponding to the character information that is contained in the information to be output, such as different-language words and comments, i.e., the additional information is corresponding information. The information-insertion processing unit 123 creates insertion style information indicating how the different-language words and the comments, etc., are to be inserted to the information to be output and inputs the insertion style information to the output-information creating unit 124.

The output-information creating unit 124 inserts the corresponding information, for example, different-language words and comments to the information to be output using the insertion style information received from the information-insertion processing unit 123, thereby creating output information to be output as a final product. In this manner, the information-insertion control unit 120 performs the information inserting process according to the present embodiment.

The information inserting process performed by the information-insertion control unit 120 according to the present embodiment is described below with reference to FIG. 9. In the following description, it is assumed that the information-insertion control unit 120 obtains an image shown in FIG. 10 illustrating a document written in English as the input information and inserts different-language words into the input information.

FIG. 9 is a flowchart of operations of the information-insertion control unit 120 according to the present embodiment. The input-information obtaining unit 121 obtains the input information shown in FIG. 10 (Step S1101). The input-information obtaining unit 121 inputs the obtained input information to the character-information recognizing unit 122.

When the character-information recognizing unit 122 receives the input information from the input-information obtaining unit 121, the character-information recognizing unit 122 performs the character recognizing process in the manner described with reference to FIG. 4 (Step S1102). It is noted that, in the above description with reference to FIG. 4, the document written in Japanese shown in FIG. 5 is used as the input information and the character/display-area information contains information about coordinates indicating the area in which the line-by-line character information is displayed as shown in FIG. 8. In contrast, if the document written in English shown in FIG. 10 is used as the input information, it is possible to extract information about coordinates indicating an area in which a word image is displayed. Because individual words are separated by spaces, individual areas in which a single word is displayed can be easily determined.

Accordingly, the character-information recognizing unit 122 creates information that contains the character information on the basis of words (hereinafter, "word-by-word character information") and information about coordinates indicating the area in which the word is displayed in association with each other as shown in FIG. 14. The character-information recognizing unit 122 inputs the character/display-area information and the word-by-word character information to the information-insertion processing unit 123. The coordinate system of the image data according to the present embodiment is shown in FIG. 15, and area-defining coordinates of the image data are shown in FIG. 16.

When the information-insertion processing unit 123 receives the information from the character-information recognizing unit 122, the information-insertion processing unit 123 selects one word from the character/display-area information (Step S1103). More particularly, the information-insertion processing unit 123 obtains at Step S1103 a word to which the corresponding information, for example, a corresponding different-language word, is to be added from a plurality of words contained in the character/display-area information. The information-insertion processing unit 123 works as a character-information obtaining unit.

The information-insertion processing unit 123 searches for a different-language word corresponding to the selected word by referring to the glossary DB 109 (Step S1104). If a different-language word corresponding to the word that is selected at Step S1103 is found (Yes at Step S1105), the information-insertion processing unit 123 extracts the corresponding different-language word from the glossary DB 109 as the corresponding information (Step S1106). The information-insertion processing unit 123 works as a corresponding-information obtaining unit that obtains the corresponding information that corresponds to the target character information.

When the corresponding information is extracted, the information-insertion processing unit 123 determines the insertion style of the corresponding information using information about the word that is selected at Step S1103 (hereinafter, "target word") (Step S1107). More particularly, the information-insertion processing unit 123 creates the insertion style information that contains the different-language word to be inserted and the insertion style in association with each other at Step S1107. The insertion style contains the character size, the line number, and the position of the word to be inserted, for example, whether the word is displayed near the target word or in a footnote.

If all the words contained in the information to be output have been selected at Step S1107 (Yes at Step S1108), the information-insertion processing unit 123 inputs the insertion style information to the output-information creating unit 124. The output-information creating unit 124 creates, using the insertion style information that is created by the information-insertion processing unit 123, the output information by inserting the additional information, for example, the different-language words and the comments to the information to be output (Step S1109), and the process control goes to end. If all the words contained in the information to be output have not been selected at Step S1107 (No at Step S1108), the process control repeats the processes at Step S1103 and the subsequent steps. If no different-language word is found by the dictionary search at Step S1104 (No at Step S1105), the process control goes to the determination at Step S1108, skipping the processes at Steps S1106 and S1107.

The following points are to be noted in the character-information recognizing process performed by the character-information recognizing unit 122 and the information-insertion process performed by the information-insertion processing unit 123.

If a typical character-information recognizing process is performed, the character code, the candidate character code, and the position at which the corresponding character image is located are obtained as a result of the character-information recognizing process. The positions at which the character images, the line images, and the like are located on the image are expressed by the circumscribed rectangles in most cases. As shown in FIGS. 15 and 16, the circumscribed rectangle is defined by coordinates of a pair of diagonal points (Xs, Ys) and (Xe, Ye).

In a well-known "PDF with transparent texts", the character codes are superimposed on the original image in the form of transparent texts at positions indicated by the coordinates of the circumscribed rectangles of the extracted character information. Although the PDF with transparent texts looks like an image, it includes searchable text data. If a PDF is used, the transparent texts do not appear on the printed copy and therefore no adverse effects are given to the printed copy of the original image. If data is displayed using a PDF display software, for example, Adobe Reader, when the user specifies a transparent text area with the mouse or the like to highlight the text, the transparent text become visible.

By arranging the character information extracted from the original image in the form of the transparent texts and also arranging, on the original image, the corresponding information that corresponds to the character information in the form of visible texts that appears on the printed copy, the corresponding information can be utilized even after it is printed out. If the character information is arranged in the form of the visible texts that appears on the printed copy, because the original image and the corresponding information are recorded on different layers in a separate manner, it is possible to refer to either the original image or the corresponding information individually using an electronic-format editor software (for example, Adobe if it is a PDF). When an image added with the additional information is created by directly modifying the original image, the fidelity to the original document, which is important for the image information, will be lost. Moreover, if the corresponding information is overwritten in the visible state, a part of information may become unrecognizable. To prevent these problems, the image information and the corresponding information are recorded in the separate manner and the corresponding information is configured to switch between the visible/transparent states.

Figure 17:
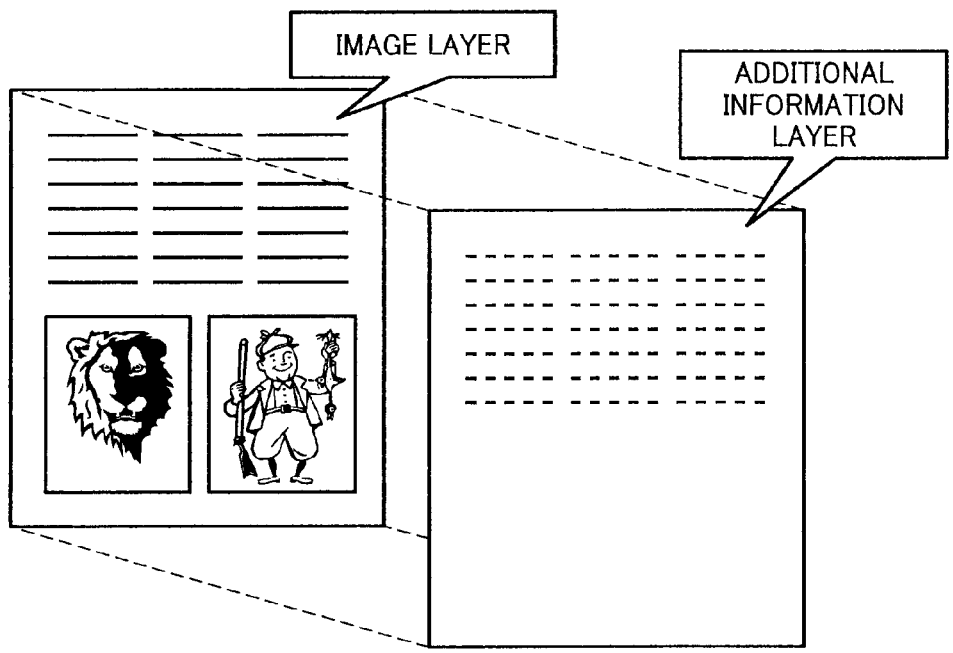
FIG. 17 is a schematic diagram that explains the relation between an image layer and an additional information layer.

FIG. 17 is a schematic diagram that explains the relation between an image layer and an additional information layer. The full lines on the image layer are the character images, and the dot lines on the additional information layer are the corresponding information (text information). The dot lines on the additional information layer are corresponding to the full lines on the image layer, respectively. A PDF with transparent texts is an electronic document format in which character images of the original image shown in FIG. 10 are converted into text data using the OCR, and a layer on which the text data in the transparent state is arranged is overlapped on another layer on which the character images of the original image are arranged. In the PDF with transparent texts, the human eye sees only the background character image through the invisible text data; however, the computer can read the text data. FIG. 11 is a schematic diagram of an image that is created by reading the transparent texts of the character information (English words), translating the character information (English words) into the corresponding information (different-language words) by referring to the dictionary, and adding the corresponding information to the character information in the form of texts written in a visible color under the English words. By adding the corresponding information in this manner, the corresponding information appearing on the printed copy as shown in FIG. 11 saves the trouble to see a dictionary and helps non-English native users to read English sentences. Moreover, it remains in the form of the electronic file, and therefore the document is searchable by means of the transparent text data of the original image, which is obtained as a result of the OCR, while maintaining the format of the original image. Because the different-language words are also searchable, a user can make searches using both an original-language word and a different-language word, i.e., cross-lingual search. If, for example, there is not enough space between lines for the corresponding information, it is allowable to add reference numerals near the character information (English words) as shown in FIG. 12 and display the corresponding information associated with the reference numbers in a marginal space or the like as shown in FIG. 13.

By adding the visible corresponding information to the image data, both the image data and the corresponding information can be used at the same time from the normal browser screen or the printed copy. Moreover, if the user wishes to check either the original image data only or the corresponding information only, the user can select a desired display/printing mode using the electronic format editor/viewer software. As described above, adding the corresponding information to the image information with the corresponding information and the image information being separated from each other remarkably improves the usability. When the corresponding information is added in a visible color so that it appears on the printed copy or the browser screen, it is necessary to arrange the corresponding information so that it does not hinder the contents of the image data.

A case in which the character information that is extracted using the character images contained in the original image is added is described below. As described above, the typical processing is the "PDF with transparent texts". The PDF with transparent texts is created by converting the character images into the character codes using the OCR and arranging the character codes in the form of the transparent texts on the respective character images, which makes data searchable and makes text data easy to reuse.

As it is clear from the object of the present invention, it is unnecessary to add the corresponding information in a visible color. The providing of a dictionary search result in the conventional technology is an example in which the corresponding information is added to the image data in a visible color. However, in the conventional technology, because the original image is modified and the dictionary search result is added to the modified original image, the fidelity to the original document is lost. In contrast, by arranging the dictionary search result in a visible color on a layer different from a layer of the image data, the processed original image remaining a high fidelity to the original document appears on the printed copy or the viewer screen, while the unprocessed original image can be reproduced using the electronic format editor/viewer software.

Although, in the present embodiment, the English-to-Japanese dictionary is used and the corresponding information is different-language (Japanese) words, as long as the character information that is extracted from the original image and the corresponding information are stored in a database in the associated manner data, some other information, such as hiragana corresponding to kanji characters or descriptions about technical terms, can be the corresponding information.

The functions of the information-insertion processing unit 123 shown in FIG. 3, which are the main feature of the present invention, are described in detail below. As it is clear from the example using a PDF with transparent texts, the positions of the character data contained in the image are determined in the OCR process, and the character codes, which are results of the OCR process, are arranged at the determined positions in the form of the transparent texts. Suppose a case of reading the transparent texts of the character information (English words), translating the character information (English words) into the corresponding information (different-language words) by referring to the dictionary, and adding the corresponding information (different-language words) to the image data in the form of the visible-colored texts. In a case of adding the corresponding information (different-language words) in a visible color, it is necessary to arrange the corresponding information near the corresponding character information (English words) in such a manner that the corresponding information cannot hinder the other character images on the original image. If it is configured to manage pairs of character-image lines, detect spaces between each pair of the character-image lines, add the visible-colored texts at an adjusted character size (font height Fh) to the spaces so that the texts are arranged inside the spaces, the original image data with no damage appears on the printed copy or the viewer screen and the user can check both the original image data and the corresponding information.

Figure 18:
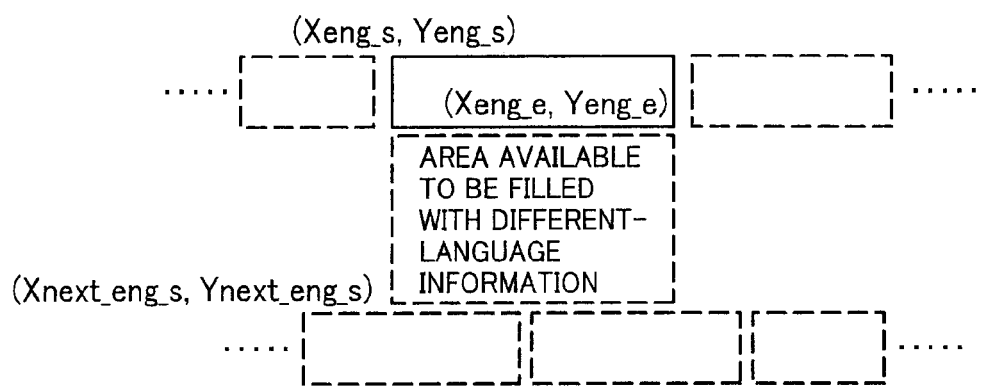
FIG. 18 is a schematic diagram of an area available to be filled with the corresponding information (different-language information) according to the embodiment of the present invention.

FIG. 18 is a schematic diagram of an area, between a pair of the lines, available to be filled with the corresponding information (different-language information). As shown in FIG. 18, if it is assumed that an area available to be filled with the corresponding information (different-language information) without giving an affect to the word character strings is defined by a regional rectangle (Xjpn_s, Yjpn_s)–(Xjpn_e, Yjpn_e), then the regional rectangle is defined as follows:

$$Xjpn\_s = Xeng\_s$$

$$Yjpn\_s = Yeng\_e$$

$$Xjpn\_e = Xeng\_e$$

$$Yjpn\_e = Ynext\_eng\_s$$

Figure 19:
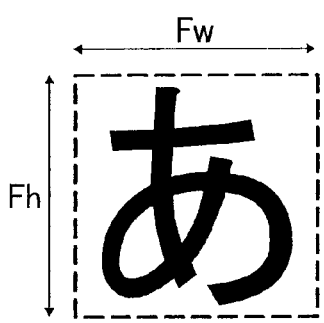
FIG. 19 is a schematic diagram that explains the definition of the font size of a text of the corresponding information (different-language information) according to the embodiment of the present invention.

To arrange the corresponding information (different-language word) at a position corresponding to the character information (English word), the head of the corresponding information (different-language word) is arranged at a position spaced downwardly from the start position of the character information (English word) (Xs, Ys) by the font height of the corresponding information (in the Y axis). If it is assumed that (Xeng_s, Yeng_s) are the coordinates of the start position of the English word;

(Xeng_e, Yeng_e) are the coordinates of the end position of the English word; and Fh is the font height of the corresponding information (FIG. 19), then the start position (Xjpn_s, Yjpn_s) of the corresponding information (different-language word) is (Xeng_s, Yeng_s–Fh). The value of Fh is determined, as described above, from the width of the space between the lines.

If a part of corresponding information (different-language word) is located beyond the area of the corresponding character information (English word), there is possibility that the part is overlapped with another piece of corresponding information of the adjacent character information (English word). To prevent this situation, the area available to be filled with the corresponding information (different-language word) is set within the area of the character information (English word). It means that if it is assumed that (Xeng_s, Yeng_s) are the coordinates of the start position of the English word;

(Xeng_e, Yeng_e) are the coordinates of the end position of the English word;

(Xjpn_s, Yjpn_s) are the coordinates of the start position of the different-language word; and (Xjpn_e, Yjpn_e) are the coordinates of the end position of the different-language word, and if the corresponding information (different-language word) is to be arranged within the area of the character information (English word), then the width of the different-language word printable area is calculated using (Xeng_e−Xeng_s).

If the font width Fw (FIG. 19) is fixed and the number of characters of the different-language word is N_jpn, and if (Xeng_e−Xeng_s)>Fw×N_jpn, then the font width Fw is small enough for the corresponding information (different-language word) to be included within the area.

However, if (Xeng_e−Xeng_s)<Fw×N_jpn, then the area filled with the corresponding information (different-language word) extends out of the area the area of the character information (English word). In this case, a new font width Fw' is calculated as follows:

$$Fw'=(Xeng\_e-Xeng\_s)/N\_jpn$$

and the calculated new font width Fw' is used instead of Fw.

Figure 20:
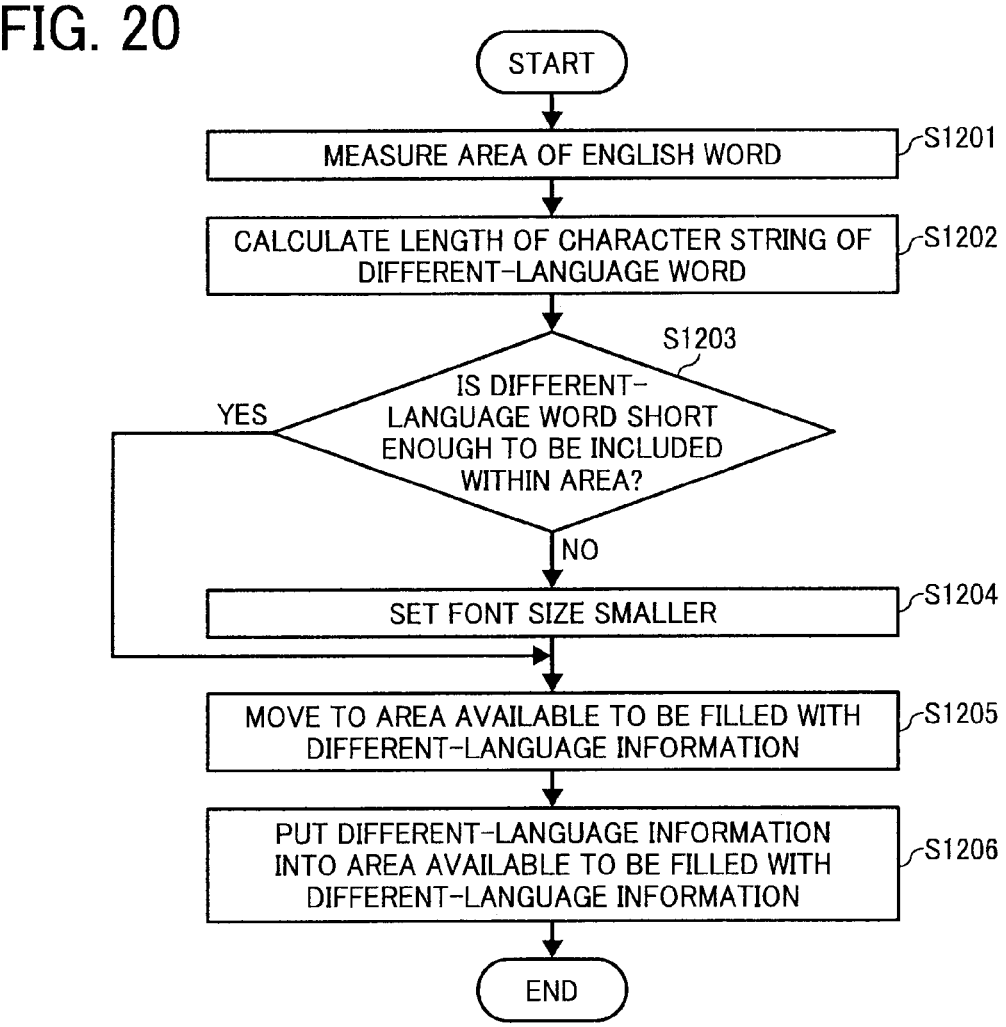
FIG. 20 is a detailed flowchart of an insertion-style determining process (at Step S1107) of FIG. 9 according to the embodiment of the present invention.

FIG. 20 is a detailed flowchart of the process of determining the insertion style at Step S1107 of FIG. 9 in which the corresponding information (different-language information) is added with an adjusted font size.

The area of the character information (English word) is calculated (Step S1201). A length of the character string of the corresponding information (different-language word) is calculated (Step S1202). It is determined whether the currently-specified font size is small enough for the corresponding information (different-language word) to be included within the area that is calculated at Step S1201 (Step S1203). If the determination is positive (Yes at Step S1203), the process control goes to Step S1205. If the determination is negative (No at Step S1203), the process control goes to Step S1204. A new font size that is small enough for the corresponding information to be included within the area of the character information (English word) is calculated and the font size is set to the new font size (Step S1204). The position at which a result of the dictionary search is to be arranged is calculated and an insertion position of the result moves to the calculated position (Step S1205). The corresponding information (different-language word), i.e., the result of the dictionary search is added (Step S1206). In other words, the information-insertion processing unit 123, which performs the insertion-style determining process shown in FIG. 20, works as an area-information obtaining unit that obtains information about an area available to be filled with the corresponding information (hereinafter, "area information") and an insertion-style determining unit that determines the insertion style of the corresponding information.

Figure 21A:
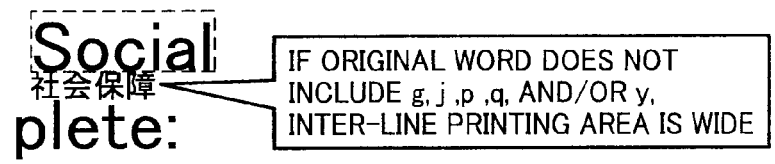
FIG. 21A is a schematic diagram of an example in which the corresponding information is not overlapped with the character information.
Figure 21B:
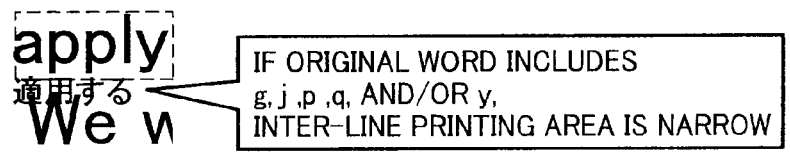
FIG. 21B is a schematic diagram of an example in which the corresponding information is overlapped with the character information.
Figure 25:
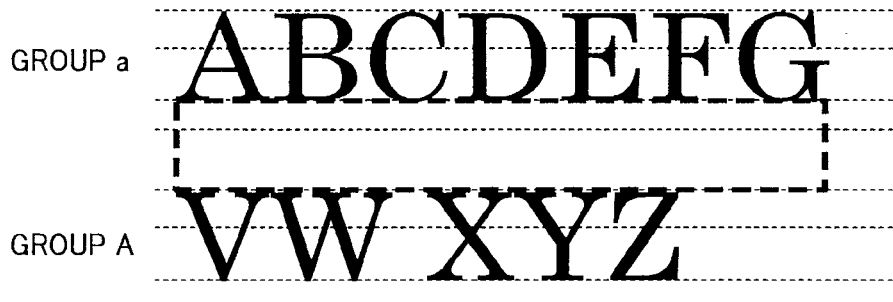
FIG. 25 is a schematic diagram of a first example of the area available to be filled with the corresponding information that is calculated based on Table 3 according to the embodiment of the present invention.
Figure 26:
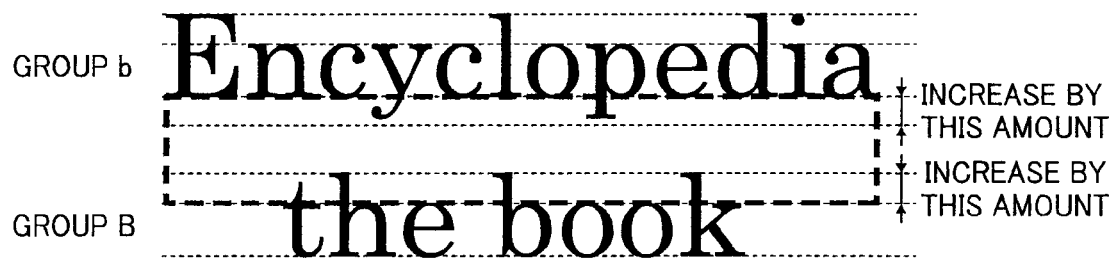
FIG. 26 is a schematic diagram of a second example of the area available to be filled with the corresponding information that is calculated based on Table 3 according to the embodiment of the present invention.
Figure 27:
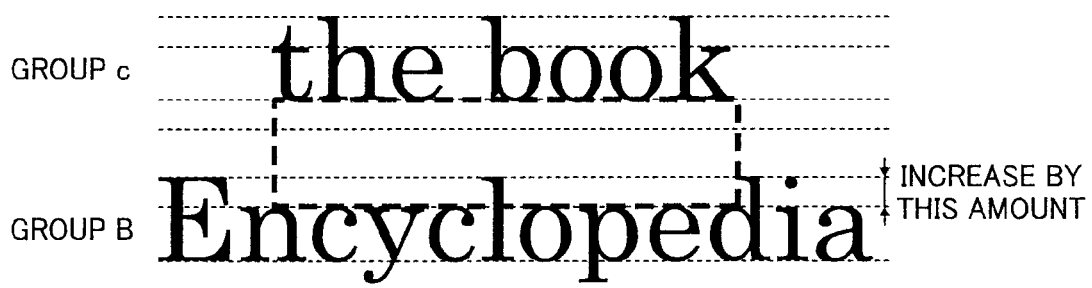
FIG. 27 is a schematic diagram of a third example of the area available to be filled with the corresponding information that is calculated based on Table 3 according to the embodiment of the present invention.
Figure 28:
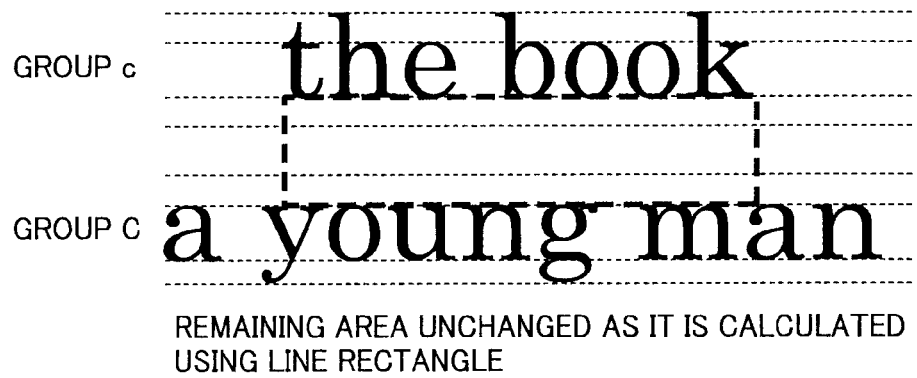
FIG. 28 is a schematic diagram of a fourth example of the area available to be filled with the corresponding information that is calculated based on Table 3 according to the embodiment of the present invention.
Figure 29:
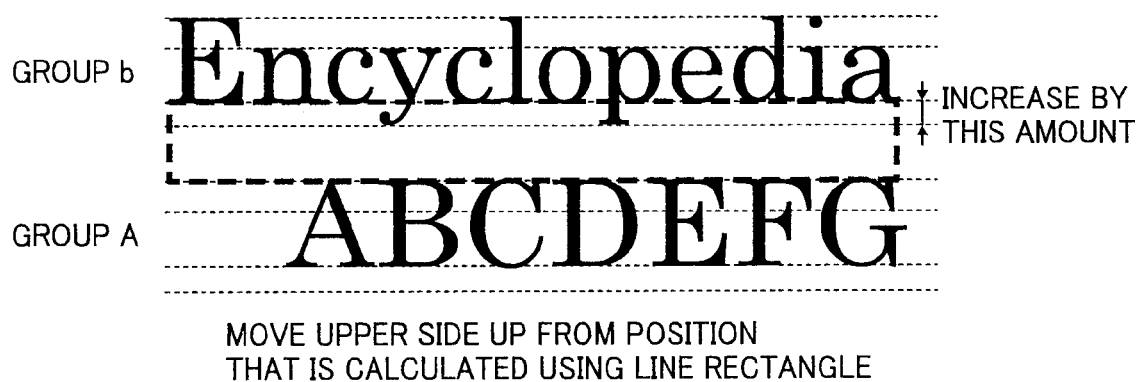
FIG. 29 is a schematic diagram of a fifth example of the area available to be filled with the corresponding information that is calculated based on Table 3 according to the embodiment of the present invention.

FIG. 21A is a schematic diagram of an example in which the corresponding information is not overlapped with the character information, and FIG. 21B is a schematic diagram of an example in which the corresponding information is overlapped with the character information. If the font size of the corresponding information (different-language words) is too small, it is difficult to read by the human eye, i.e., there is a lower limit to the effective font size. Therefore, the corresponding information may be overlapped with the next line as shown in FIG. 21B, which makes it difficult to read the next line. Moreover, the corresponding information may be arranged closer to the next line than the current line, which gives a wrong impression about which line the corresponding information is related to.

As shown in FIG. 22, in the Latin alphabets, characters are aligned with several imaginary lines and some spaces between the imaginary lines are occupied only by specified characters. For example, if a line includes only the uppercase letters, the space between the baseline and the descender line (hereinafter, "descender space") is unoccupied. If a line includes any of the lowercase letters g, j, p, q, and y, the descender space is occupied. If a line includes any of the uppercase letters and the lowercase letters b, d, f, h, i, j, k, and l, the space between the ascender line and the mean line (hereinafter, "ascender space") is occupied. Therefore, it is possible to increase the height of the area available to be filled with additional information lying between the lines as shown in FIG. 18 by making use of these occasionally-used spaces and, in turn, decrease a part overlapped with the original character image. Even if the descender space is occupied, because the descender space is only a part of the character string, serious effects will not be caused by the overlapped part.

To solve the above problems, a check on the character codes contained in the extracted character information is conducted and the area available to be filled with additional information that is calculated in the manner as shown in FIG. 18 is adjusted using the result of the check. The information about the character codes in the character information is obtained by the OCR and the area of the character information and the character codes contained in the character information are available. In the example shown in FIG. 18, the area available to be filled with additional information is calculated using the circumscribed rectangle of the character information. Whether the area available to be filled with additional information is expandable is determined using the result of the character code check.

TABLE 1

| GROUP NAME | FEATURES OF TEXTS INCLUDED IN LINE | HOW TO CALCULATE INTER-LINE AREA AVAILABLE TO BE FILLED WITH ADDITIONAL INFORMATION |
| --- | --- | --- |
| A | ALL CAPITALIZED | REMAIN UNCHANGED AS SHOWN IN FIG. 18 |
| B | INCLUDING g, j, p, q, AND/OR y | MOVE THE UPPER SIDE UP BY THE DESCENDER SPACE (TO THE BASELINE) |
| C | NOT CATEGORIZED INTO GROUP a NOR GROUP b | REMAIN UNCHANGED AS SHOWN IN FIG. 18 |

Table 1 illustrates criteria for categorizing lines into groups based on the character codes contained in the character information and how to adjust the inter-line area available to be filled with additional information on the basis of the group. FIG. 23 is a schematic diagram of the adjusted area that has been categorized into Group b. Because the position of the descender line changes according to the font type, it is difficult to calculate an accurate height between the descender line and the baseline, in actual cases. To make the description simpler, the height between the descender line and the baseline is assumed to occupy a fixed percentage of the line height.

FIG. 24 is a detailed flowchart of the insertion-style determining process (at Step S1107) of FIG. 9, different from the detailed flowchart of FIG. 20. The area of the character information (English word) is calculated and the area available to be filled with additional information is calculated in the manner as shown in FIG. 18 (Step S1301). The character codes are obtained from the character information (English word) (Step S1302). The character information (English word) is categorized by referring to Table 1 based on the obtained character codes (Step S1303). If the character information is not Group b of Table 1 (No at Step S1303), because the adjustment by the height of the descender space is unnecessary, the adjustment height is set to 0 (remaining unchanged as it is shown in FIG. 18). If the character information is Group b of Table 1 (Yes at Step S1303), in order to make the descender space available for the area available to be filled with additional information, the adjustment height is calculated using the line height and the adjustment height is set to the calculated value (Step S1305). The height of the descender space is assumed to occupy 0.1 of the line height in this example. The value 0.1 is a setting value and can be changed as appropriately. The upper side of the area available to be filled with additional information moves up from the position that is calculated in the manner as shown in FIG. 18 by the height of the adjustment space that is calculated at Step S1305 (Step S1306). If the adjustment height is 0, the area remains unchanged as it is shown in FIG. 18. In other words, the information-insertion control unit 120, which performs the processes shown in FIG. 24, works as the area-information obtaining unit that obtains the area information on the basis of the character information contained in the image data.

The Latin alphabets are used in the above examples. In contrast, in the Japanese typeface, a character printable box called "imaginary body" is defined. For example, most of kanji characters are arranged inside a box smaller than the imaginary body (hereinafter, "letter face"), while most of hiragana characters and katakana characters are arranged inside a box smaller than the letter face. Therefore, if the target character string includes many hiragana or katakana characters, it is possible to increase the area available to be filled with additional information from the area that is calculated using the circumscribed rectangle of the character image (FIG. 18). In this manner, the check on the character codes contained in the character information is conducted and the area available to be filled with additional information is set larger depending on the result of the check.

If the original document is written in a European language, the check that is needed to adjust the area available to be filled with additional information is only the check whether any of the specified characters g, j, p, q, and y is found in the character information as shown in Table 1. In other words, the information-insertion processing unit 123 works as the area-information obtaining unit that obtains the area information depending on whether the specified characters are found in the character information contained in the image data.

As shown in FIG. 22, in the Latin alphabets, the spaces that are not always occupied include not only the descender space but also the ascender space. In the same manner as in the descender space, it is possible to conduct a check on the character codes contained in the character image and determine whether the ascender space is available for the area available to be filled with additional information using the result of the check. The ascender space lies on the upper side of the line. If the ascender space of the line immediately below the target line (i.e., the next line) is available, the lower side of the area available to be filled with additional information can move down.

TABLE 2

| GROUP NAME | LINE | FEATURES OF TEXTS INCLUDED IN LINE |
|---|---|---|
| a | CURRENT LINE | ALL CAPITALIZED |
| b | | INCLUDING g, j, p, q, AND/OR y |
| c | | NOT CATEGORIZED INTO GROUP a NOR GROUP b |
| A | NEXT LINE | ALL CAPITALIZED |
| B | | INCLUDING b, d, f, h, I, j, k, AND/OR l. IF INCLUDING UPPERCASE LETTERS, UP TO ONE. |
| C | | NOT CATEGORIZED INTO GROUP A NOR GROUP B |

TABLE 3

| | | GROUP A NEXT LINE: ALL CAPITALIZED | GROUP B NEXT LINE: INCLUDING b, d, f, h, I, j, k, AND/OR l. IF INCLUDING UPPERCASE LETTERS, UP TO ONE. | GROUP C NEXT LINE: NOT CATEGORIZED INTO GROUP A NOR GROUP B |
|---|---|---|---|---|
| GROUP a | CURRENT LINE: ALL CAPITALIZED | REMAIN UNCHANGED AS SHOWN IN FIG. 18 | MOVE THE LOWER SIDE DOWN FROM THE POSITION SHOWN IN FIG. 18 | REMAIN UNCHANGED AS SHOWN IN FIG. 18 |
| GROUP b | CURRENT LINE: INCLUDING g, j, p, q, AND/OR y | MOVE THE UPPER SIDE UP FROM THE POSITION SHOWN IN FIG. 18 | MOVE THE LOWER SIDE DOWN AND THE UPPER SIDE UP FROM THE POSITIONS SHOWN IN FIG. 18 | MOVE THE UPPER SIDE UP FROM THE POSITIONS SHOWN IN FIG. 18 |
| GROUP c | CURRENT LINE: NOT CATEGORIZED INTO GROUP a NOR GROUP b | REMAIN UNCHANGED AS SHOWN IN FIG. 18 | MOVE THE LOWER SIDE DOWN FROM THE POSITION SHOWN IN FIG. 18 | REMAIN UNCHANGED AS SHOWN IN FIG. 18 |

Table 2 illustrates criteria for categorizing lines into groups with descenders of the current line and ascenders of the next line being taken into consideration. Table 3 illustrates criteria for determining whether the area available to be filled with additional information is expandable based on Table 2 and the adjusted areas. FIGS. 25 to 29 are schematic diagrams that explain how to calculate the area available to be filled with additional information on the basis of Table 3. The doted rectangles shown in FIGS. 25 to 29 are the area available to be filled with additional information. It is clear from FIGS. 25 to 29 that there is possibility that either the upper side or the lower side or both of the upper side and the lower side of the area can move outward into the circumscribed rectangle of the character-string image. In other words, the information-insertion processing unit 123 works as the area-information obtaining unit that obtains the area information using the result of the character-information check.

As described above, because there is the lower limit to the practical visible character size (see JIS S 0032:2003, "Guidelines for the elderly and people with disabilities—Visual signs and displays—Estimation of minimum legible size for a Japanese single character"), the minimum size of the fonts of the additional information is determined; therefore, if the character information (character) of the original document is too small and the spaces between the lines are too narrow, the corresponding information (text information) exceeds the area available to be filled with the corresponding information that is calculated in the manner as shown in FIG. 18. In this case, the corresponding information is inevitably overlapped with the character information (characters) of the original document.

To prevent the characters of the character information hidden behind the corresponding information (text information) overlapped therewith, the font color of the corresponding information is set to a pale color. The pale color, herein, is a color with a high lightness and a low saturation. More specifically, the pale color is a color that is categorized into "pale color" in the "Munsell color system" or the like. With the settings, even when the character information and the corresponding information (text information) are overlapped with each other, the character information remains recognizable. Moreover, because the corresponding information (text information) is not emphasized, a user can read the character information with no stress while checking only necessary corresponding information (text information), which remarkably improve the usability. If the information-insertion processing unit 123 sets the color of the texts of the corresponding information to be inserted, it means that the information-insertion processing unit 123 works as the insertion-style determining unit that determines the insertion style of the corresponding information.

If the character information and the corresponding information (text information) are overlapped with each other, the font color that is used to add the corresponding information is changed so that a user can distinguish the corresponding information from the character information. Two colors are specified in advance for the additional information; a first color is used in the normal cases and a second color is used when the corresponding information exceeds the area available to be filled with additional information. The color is switched between the two depending on whether the corresponding information exceeds the area available to be filled with additional information. More particularly, if the predetermined character size is too large for the corresponding information to be included within the area determined by the area-information obtaining unit, the information-insertion processing unit 123 changes the predetermined font color. In other words, the information-insertion processing unit 123 works as the insertion-style determining unit that determines the insertion style of the corresponding information.

As described above, if the readability of the character information is prioritized, use of, especially, a pale color for the font color of the corresponding information makes it possible to maintain the readability of the character information. If the information-insertion processing unit 123 uses a pale color as the new font color, it means that the information-insertion processing unit 123 works as the insertion-style determining unit that determines the insertion style of the corresponding information.

Although, in the above embodiments, the corresponding information is added word by word, it is possible to add the corresponding information sentence by sentence. For example, it is possible to translate each sentence using a machine translation process shown in FIG. 30. Because the contents of the machine translation are out of the scope of the claims, an available machine translation system is used in the embodiment and only a format how the translation result is displayed is taken notice.

Figures 30, 31:
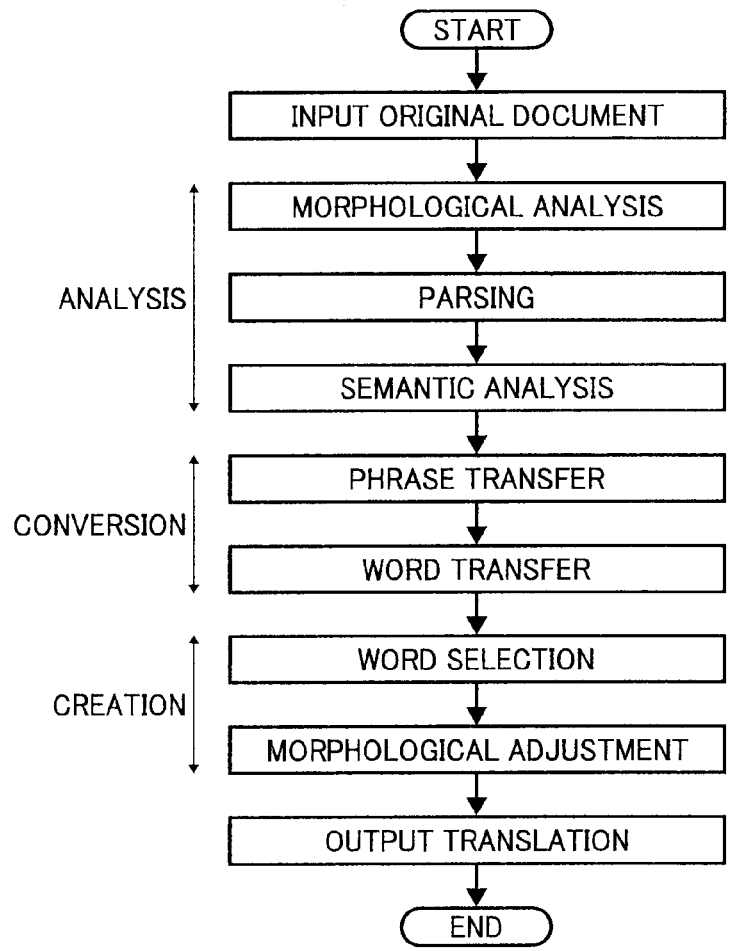
FIG. 30 is a flowchart of a typical machine translation.
FIG. 31 is a schematic diagram of an example of the area available to be filled with the corresponding information sentence-by-sentence according to the embodiment of the present invention.
Figures 32, 33:
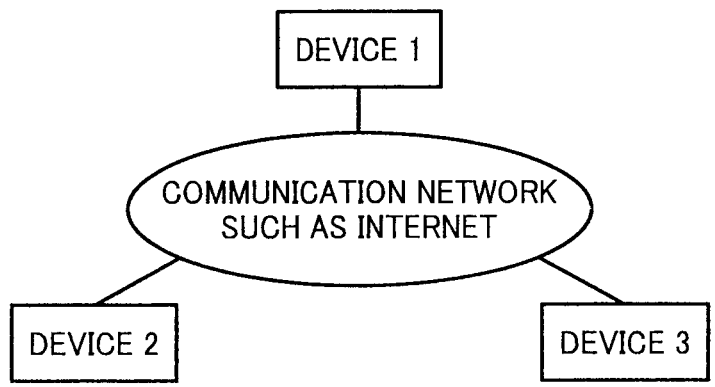
FIG. 32 is a schematic diagram of the hardware configuration of an image processing apparatus according to another embodiment of the present invention.
FIG. 33 is a block diagram of another hardware configuration of the image processing apparatus according to the embodiment of the present invention.

As shown in FIG. 31, it is possible to determine areas of individual sentences of the character information (original-language sentence) in a simple manner by analyzing the original text. The area available to be filled with additional information is determined based on a method according to the present invention. FIG. 32 is a schematic diagram of an example that is created by, after the corresponding information (different-language sentence) corresponding to the character information (original-language sentence) is obtained by the machine translation process shown in FIG. 30, adding the corresponding information (different-language sentence) to the corresponding area available to be filled with additional information according to a method of the present invention. If the area available to be filled with additional information is calculated according to a method of the present invention, it is easy to add the corresponding information (text information) to the character information. The methods of the present embodiment can be implemented on the hardware as shown in the block diagram of FIG. 1. Alternatively, it is possible to put a part of the functions on a network so that the methods can be implemented using a communication line or the like as shown in the block diagram of FIG. 33. The same effects will be obtained if the latter configuration is used.

According to the invention, an original image added with additional information is created in the form of an electronic file in such a manner that the original image is on a first layer and the additional information written in a visible color is on a second layer. With this configuration, the additional information is available even in printing without losing advantages in adding information to the unprocessed original image.

Moreover, an area available to be filled with additional information is increased depending on a result of a check of character codes contained in the character image of the original document and the larger area available to be filled with additional information is obtained. This helps to prevent overlap of the corresponding information (additional-information text) and the original character image.

With this configuration, a user can use the additional information in both the electronic file format and the printed state and the character image of the original document and the related corresponding information (additional information texts) are arranged nonoverlapped therewith, which remarkably improves the usability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that inserts corresponding information, which corresponds to character information contained in image data, to the image data in a form of an electronic file, the information processing apparatus comprising:
   an image-data obtaining unit that obtains image data containing a plurality of pieces of character information;
   a corresponding-information obtaining unit that obtains corresponding information that corresponds to the character information obtained from the image data;
   an area-information obtaining unit that obtains area information that indicates an area to which the corresponding information is to be inserted, depending on a formation of lines containing the character information;
   an insertion-style determining unit that determines an insertion style of the corresponding information based on the obtained area information; and
   an information-insertion control unit that records, via a processor, the image data and the corresponding information on different layers in the electronic file and inserts the corresponding information into the image data in a visible color according to the insertion style determined by the insertion-style determining unit.

2. The information processing apparatus according to claim 1, wherein the area-information obtaining unit obtains the area information based on the character information contained in the image data.

3. The information processing apparatus according to claim 1, wherein the area-information obtaining unit obtains the area information depending on whether a predetermined character is found in the character information contained in the image data.

4. The information processing apparatus according to claim 1, wherein the area-information obtaining unit obtains the area information depending on a result of checking whether predetermined character information is found in a first line on the image data corresponding to the corresponding information and a second line on the image data that lies immediately below the first line.

5. The information processing apparatus according to claim 1, wherein the insertion-style determining unit sets a pale color as a color of texts of the corresponding information to be inserted.

6. The information processing apparatus according to claim 1, wherein, when a predetermined character size is too large for the corresponding information to be included within the area obtained by the area-information obtaining unit, the insertion-style determining unit changes the color of texts from a specified color to a new color.

7. The information processing apparatus according to claim 6, wherein the insertion-style determining unit sets a pale color as the new color.

8. An information processing method of inserting corresponding information, which corresponds to character information contained in image data, to the image data in a form of an electronic file, the information processing method comprising:
   obtaining image data that contains a plurality of pieces of character information;
   obtaining corresponding information that corresponds to the character information obtained from the image data;
   obtaining area information that indicates an area to which the corresponding information is to be inserted, depending on a formation of lines containing the character information;
   determining an insertion style of the corresponding information based on the obtained area information; and
   recording, via a processor, the image data and the corresponding information on different layers in the electronic file and inserting the corresponding information into the image data in a visible color according to the determined insertion style.

9. A non-transitory computer-readable medium storing computer readable instructions thereon for inserting corresponding information, which corresponds to character information contained in image data, to the image data in a form of an electronic file, the instructions when executed by a computer causing the computer to perform a method comprising:
   obtaining image data that contains a plurality of pieces of character information;
   obtaining corresponding information that corresponds to the character information obtained from the image data;
   obtaining area information that indicates an area to which the corresponding information is to be inserted, depending on a formation of lines containing the character information;
   determining an insertion style of the corresponding information based on the obtained area information; and
   recording the image data and the corresponding information on different layers in the electronic file and inserting the corresponding information into the image data in a visible color according to the determined insertion style.

* * * * *